United States Patent [19]

Brown et al.

[11] Patent Number: 5,209,889
[45] Date of Patent: May 11, 1993

[54] METHOD FOR OPERATION OF SHUTTLE ASSEMBLY FOR USE IN AN INJECTION MOLDING MACHINE

[75] Inventors: Robert L. Brown, Hartville; Edward F. Huff, Wadsworth, both of Ohio

[73] Assignee: GenCorp Inc., Fairlawn, Ohio

[21] Appl. No.: 774,448

[22] Filed: Oct. 10, 1991

[51] Int. Cl.$^5$ ............................................. B29C 45/04
[52] U.S. Cl. ............................... 264/297.2; 264/297.7; 264/328.8; 264/328.11; 425/575
[58] Field of Search ............. 264/297.2, 297.7, 328.8, 264/328.11; 425/183, 185, 190, 195, 574, 575, 357

[56] References Cited

U.S. PATENT DOCUMENTS

| | | |
|---|---|---|
| 3,982,869 | 9/1976 | Eggers . |
| 4,205,950 | 6/1980 | Suss et al. . |
| 4,379,685 | 4/1983 | Tada et al. ............... 264/328.11 |
| 4,402,657 | 9/1983 | Laghi . |
| 4,462,783 | 7/1984 | Hehl . |
| 4,472,127 | 9/1984 | Cyriax et al. . |
| 4,518,338 | 5/1985 | Hehl . |
| 4,529,371 | 7/1985 | Nickley . |
| 4,555,228 | 11/1985 | Nishiike et al. . |
| 4,588,365 | 5/1986 | Holzschuh . |
| 4,630,802 | 12/1986 | Frykendahl . |
| 4,708,633 | 11/1987 | Hayashi et al. . |
| 4,810,181 | 3/1989 | Ozawa . |
| 4,861,258 | 8/1989 | Margiaria et al. . |
| 4,946,358 | 8/1990 | Okuda . |
| 5,026,265 | 6/1991 | Kanai et al. ............... 264/328.11 |

Primary Examiner—Jill L. Heitbrink

[57] ABSTRACT

A shuttle assembly for an injection molding machine includes a shuttle-support unit adapted to be attached to the machine frame and a shuttle-mold interfacing unit, slidably coupled to the support unit. Mold-coupling members removably coupling a first movable mold platen unit and a second mold platen unit to the shuttle-mold interfacing unit. During operation of the shuttle assembly, a shuttle-drive unit selectively reciprocally indexes the shuttle-mold interfacing unit in a preferably horizontal shuttle-travel path between (i) a first shuttle position whereat the first movable mold platen unit, when coupled thereto, is situated at a first unloading-/loading position, and the second movable platen unit, when coupled thereto, is situated at a clamping position; and (ii) a second shuttle position where the first movable mold platen unit, when coupled thereto, is situated at a clamping position, and the second movable platen unit, when coupled thereto, is situated at a second unloading position. In the preferred embodiment, the first unloading position and the second unloading position are located on opposite sides of the clamping position.

6 Claims, 17 Drawing Sheets

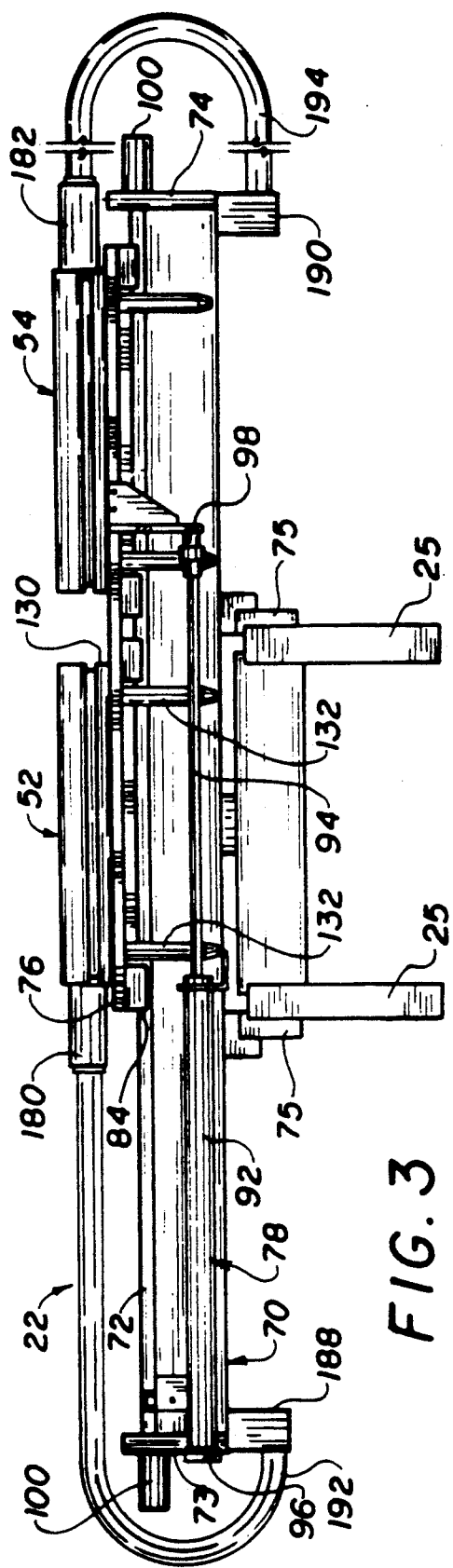
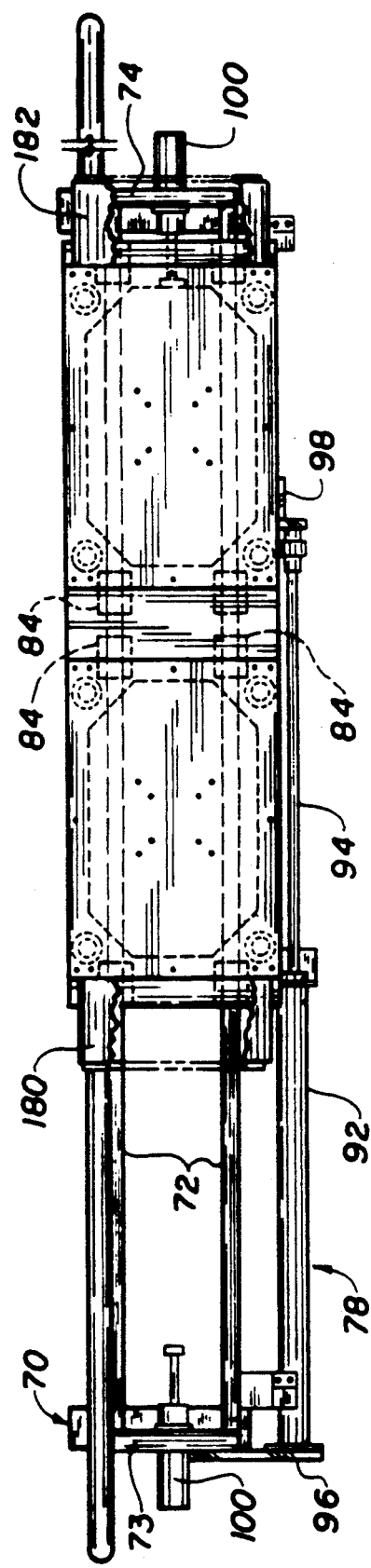

METHOD FOR OPERATION OF SHUTTLE ASSEMBLY FOR USE IN AN INJECTION MOLDING MACHINE

FIELD OF THE INVENTION

This invention relates to a shuttle assembly for use in an injection molding machine.

BACKGROUND OF THE INVENTION

The operational components of an injection molding machine usually include a stock supply assembly, an extruder assembly, an injection assembly, a mold pallet assembly, and a clamping assembly. In a typical molding process, the stock supply assembly supplies a certain amount of stock material to the extruder assembly. The extruder assembly plasticizes the stock material into an injection material and conveys a measured amount, or "shot", to the injection assembly. The injection assembly then injects the material into a complete mold cavity formed by the mold pallet assembly and the clamping assembly provides the force necessary for successful molding.

The mold pallet assembly is usually formed by two selectively joinable/separable mold platen units. In most injection molding machines, at least one of the mold platen units is movable. When an injection molding machine is used in an insert molding procedure, the mold platen units are initially separated and an unfinished product is loaded into one of the mold platen units. The movable mold platen unit is then joined together with the stationary mold platen unit to form a mold cavity. Once the mold cavity has been formed, the shot of injection material is then injected and the clamping assembly provides the necessary force to hold the mold pallet assembly together. The movable mold platen unit is then separated from the stationary mold platen unit and the molded product is unloaded from the mold cavity.

In such a molding procedure, the injection molding machine is idle for significant periods of time because once the molding process has been completed, a subsequent molding process cannot begin until loading/unloading steps are performed. Thus, the machine remains idle during these loading/unloading steps.

SUMMARY OF THE INVENTION

The present invention provides an injection molding machine which eliminates substantial periods of machine idleness. This is accomplished by a shuttle assembly which allows the molding process to be performed on one mold platen unit while unloading/loading steps are performed on another mold platen unit. The shuttle assembly also permits the unloading/loading steps to be efficiently and easily performed by an operator of the machine. These features are believed to increase productivity by an average of 80% in insert molding procedures, and in some specific procedures to increase productivity as much as 400%.

More particularly, the present invention provides a shuttle assembly for an injection molding machine having a machine frame and a mold pallet assembly which includes a first movable mold platen unit and a second movable mold platen unit. The shuttle assembly includes a shuttle-support unit which is adapted to be attached to the machine frame and a shuttle-mold interfacing unit which is slidably coupled to the shuttle-support unit. Mold-coupling members are provided for removably coupling the first movable mold platen unit and the second movable mold platen unit to the shuttle-mold interfacing unit.

During operation of the shuttle assembly, a shuttle-drive unit selectively shuttles the shuttle-mold interfacing unit in a preferably horizontal shuttle-travel path between: (i) a first shuttle position at which the first movable mold platen unit, when coupled thereto, is situated at a first unloading/loading position, and the second movable platen unit, when coupled thereto, is situated at a clamping position; and (ii) a second shuttle position at which the first movable mold platen unit, when coupled thereto, is situated at the clamping position, and the second movable platen unit, when coupled thereto, is situated at a second unloading/loading position. In the preferred embodiment, the first and the second movable platen units are loaded/unloaded on opposite sides of the clamping position.

A control system is also provided for automatically and manually controlling operation of the injection molding machine including, for example, the shuttle assembly, supply assembly, extruder assembly, injection assembly and clamping assembly.

Other features and advantages of the present invention will become apparent from the following detailed description of the preferred embodiment made with reference to the accompanying drawings, which form a part of the specification.

BRIEF DESCRIPTION OF THE DRAWINGS

In the annexed drawings:

FIG. 2A–2L are schematic front elevations of the injection molding machine showing the components thereof in sequential stages of the molding process;

FIG. 3 is a generally isolated front view of the shuttle assembly;

FIG. 4 is a top plan view of the shuttle assembly;

DETAILED DESCRIPTION

Figure 1:
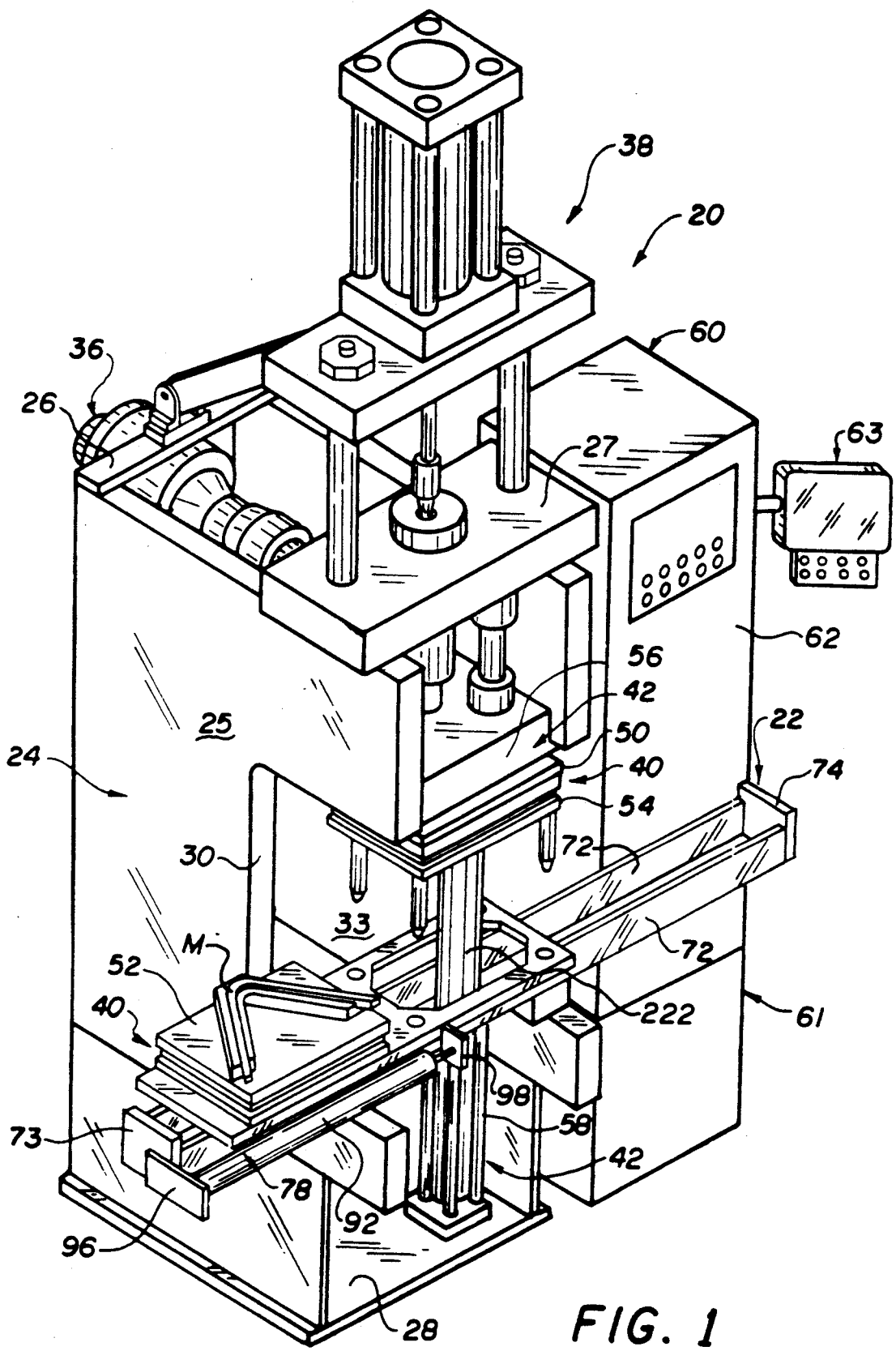
FIG. 1 is a schematic, perspective view of an injection molding machine according to the present invention, the machine including a shuttle assembly, a stock supply assembly, an extruder assembly, an injection assembly, a mold pallet assembly, a clamping assembly and a control system.

Referring now to the drawings in detail, and initially to FIG. 1, an injection molding machine according to the present invention is indicated generally at 20. The injection molding machine 20 includes a shuttle assembly, indicated generally at 22, which allows unloading-/loading steps to be performed on one movable mold platen unit while another movable mold platen unit is participating in the molding process.

The outer structure of the injection molding machine 20 comprises a frame 24 which includes two vertical side plates 25, a top horizontal mounting plate 26, a horizontal injector plate 27 and a horizontal base plate 28. The horizontal plates 26-28 extend between and support the vertical plates 25 to rigidify the machine frame 24. The side plates 25 have C-shaped cutouts 30 formed thereon which cooperatively define a molding chamber, indicated generally at 33. As shown in FIG. 1, the shuttle assembly 22 is mounted on frame 24 and extends horizontally through the molding chamber 33.

The operational components of the injection molding machine 20 are designed to convert stock material into molded products, such as a first molded product M and a second molded product MP (not specifically shown in FIG. 1). The operational components include a stock supply assembly (not specifically shown), an extruder assembly comprising a conventional screw extruder, indicated generally at 36, and an injection assembly including a conventional nozzle unit and hydraulic cylinder, indicated generally at 38. These assemblies may be of a conventional construction and thus their particular structure and operation will not be expanded on in detail in this discussion. The injection machine or injection press of the illustrated embodiment is a 5 ton injection press of the type manufactured by Sanyu of Japan.

The operational components of the injection molding machine 20 further include a mold pallet assembly, indicated generally at 40, and a clamping assembly indicated generally at 42. The mold pallet assembly 40 includes: a stationary upper mold platen unit, indicated generally at 50, a first-movable lower platen unit, indicated generally at 52, and a second movable lower mold platen unit, indicated generally at 54. The clamping assembly 42 includes a stationary upper clamping plate, indicated generally at 56, and a movable lower clamping device, indicated generally at 58. The stationary clamping plate 56 is an upper bolster plate secured between the vertical side plates by conventional fasteners.

While some of the features of the mold pallet assembly 40 and the clamping assembly 42 are of a conventional construction and part of a conventional Sanyu press, these assemblies coordinate with the shuttle assembly 22. The specific "shuttle-coordinating" features of the mold pallet assembly 40 and the clamping assembly 42 are discussed in detail below.

In a typical operational sequence of the injection molding machine 20, the stock supply assembly supplies a certain amount of stock material through an opening (not specifically shown) in the extruder assembly 36. The extruder assembly 36 plasticizes the stock material into an injection material which is then conveyed to the injection assembly 38. The shuttle assembly 22 and the clamping assembly 42 cooperate to manipulate the various components of the mold pallet assembly 40 to form a complete mold cavity to receive the injection material from the injection assembly 38.

The manipulation of the mold pallet assembly 40 particularly includes the shuttle assembly 22 shuttling the movable mold platen units 52 and 54 in a shuttle-travel path between a clamping position and first and second loading/unloading positions, respectively. Additionally, the lower clamping device 58 moves the movable mold platen unit 52 or 54 in alignment therewith in a clamp-travel path between a shuttling level and an injection level. Preferably, the shuttle-travel path is in a substantially horizontal direction and the clamp-travel path is a substantially vertical direction.

Figure 2A:
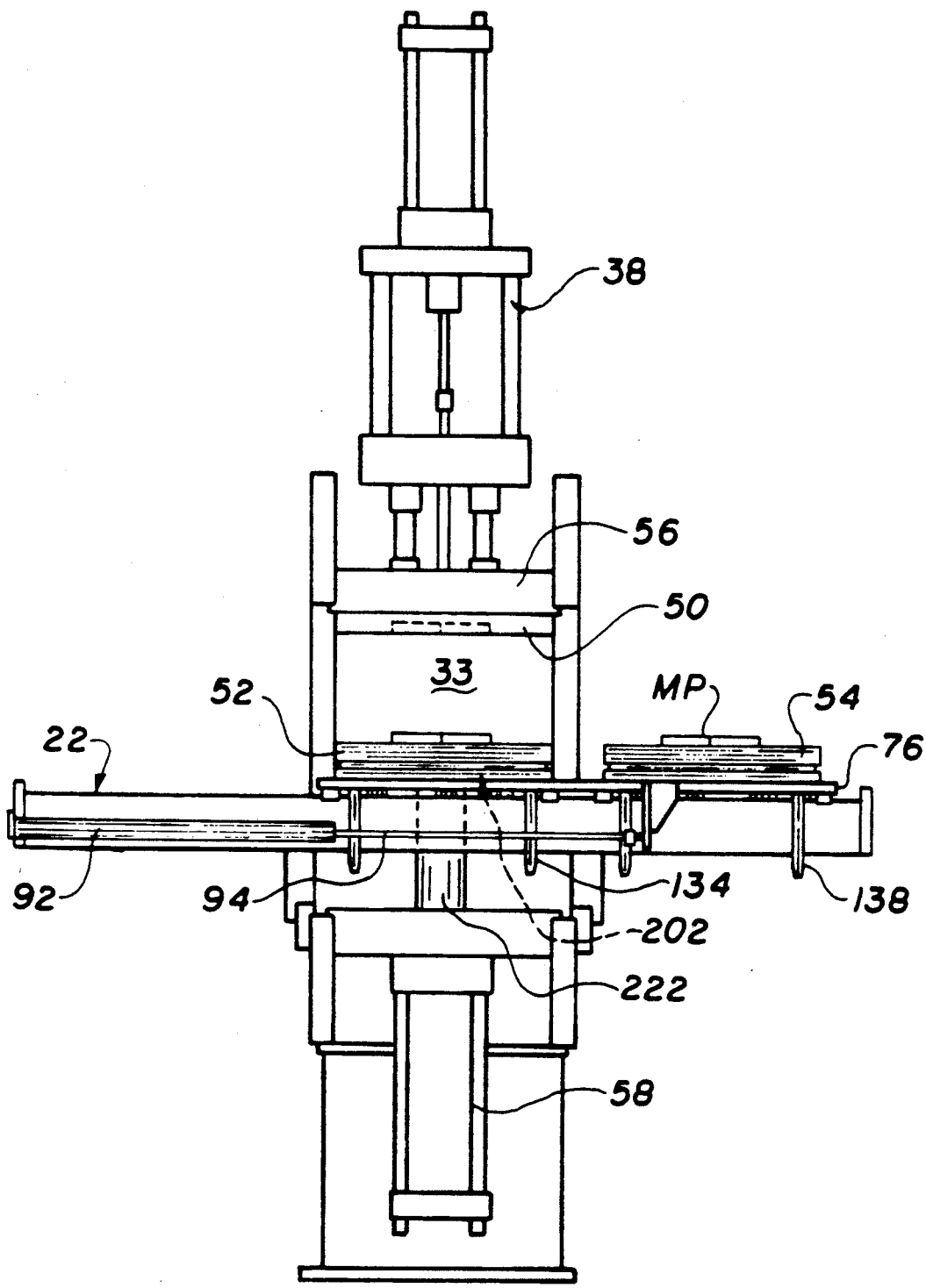
Figure 2B:
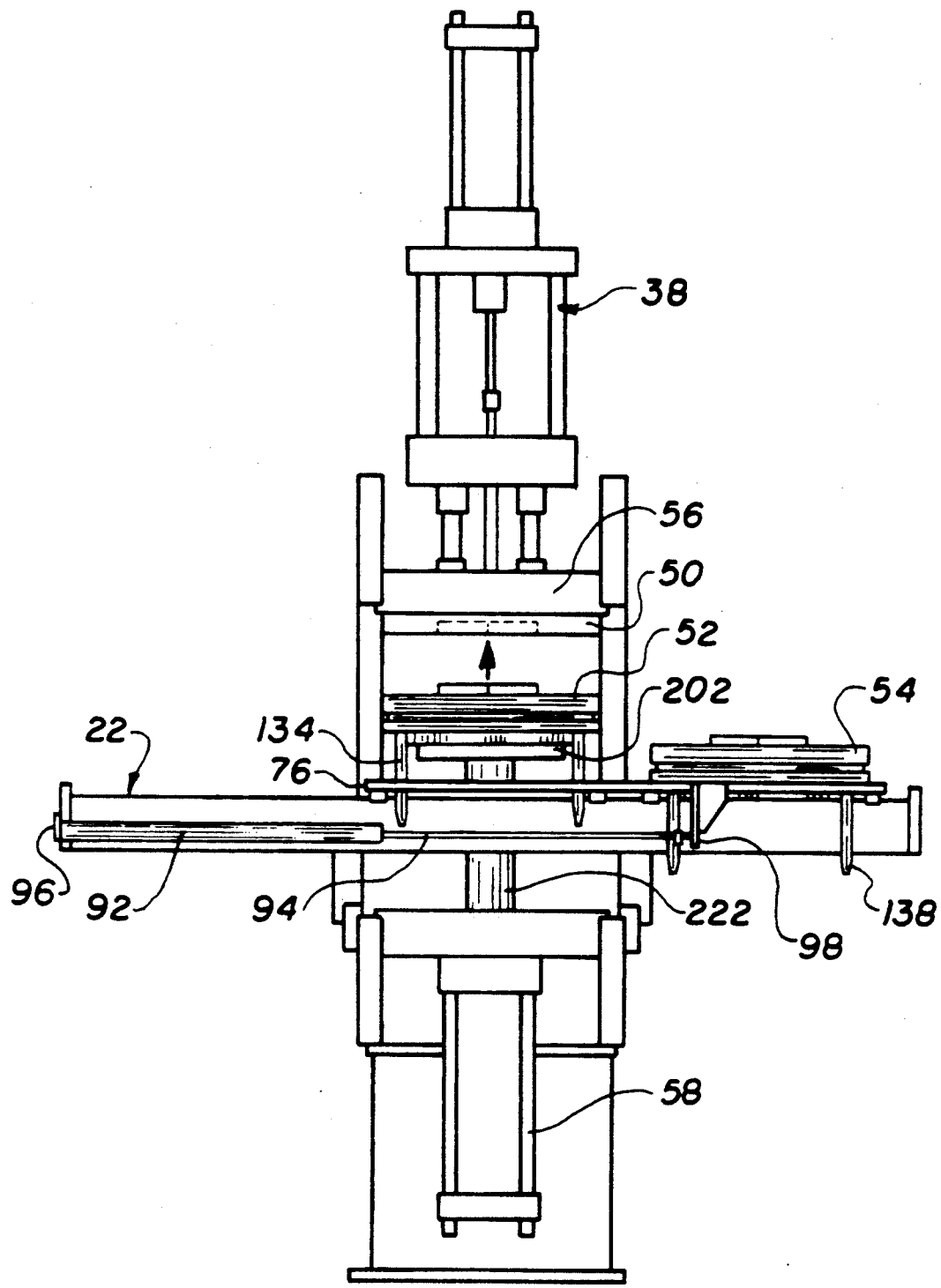
Figure 2C:
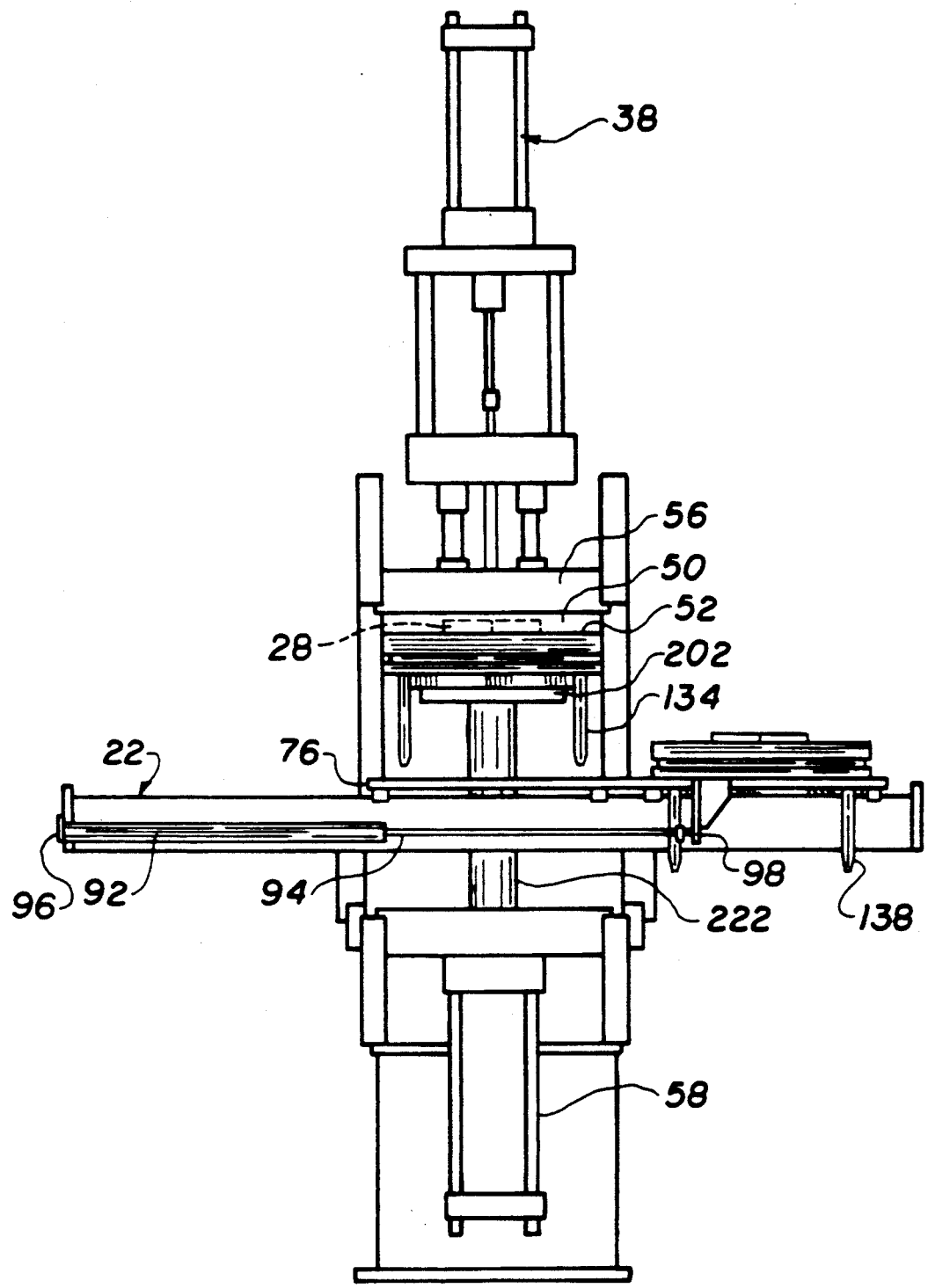
Figure 2D:
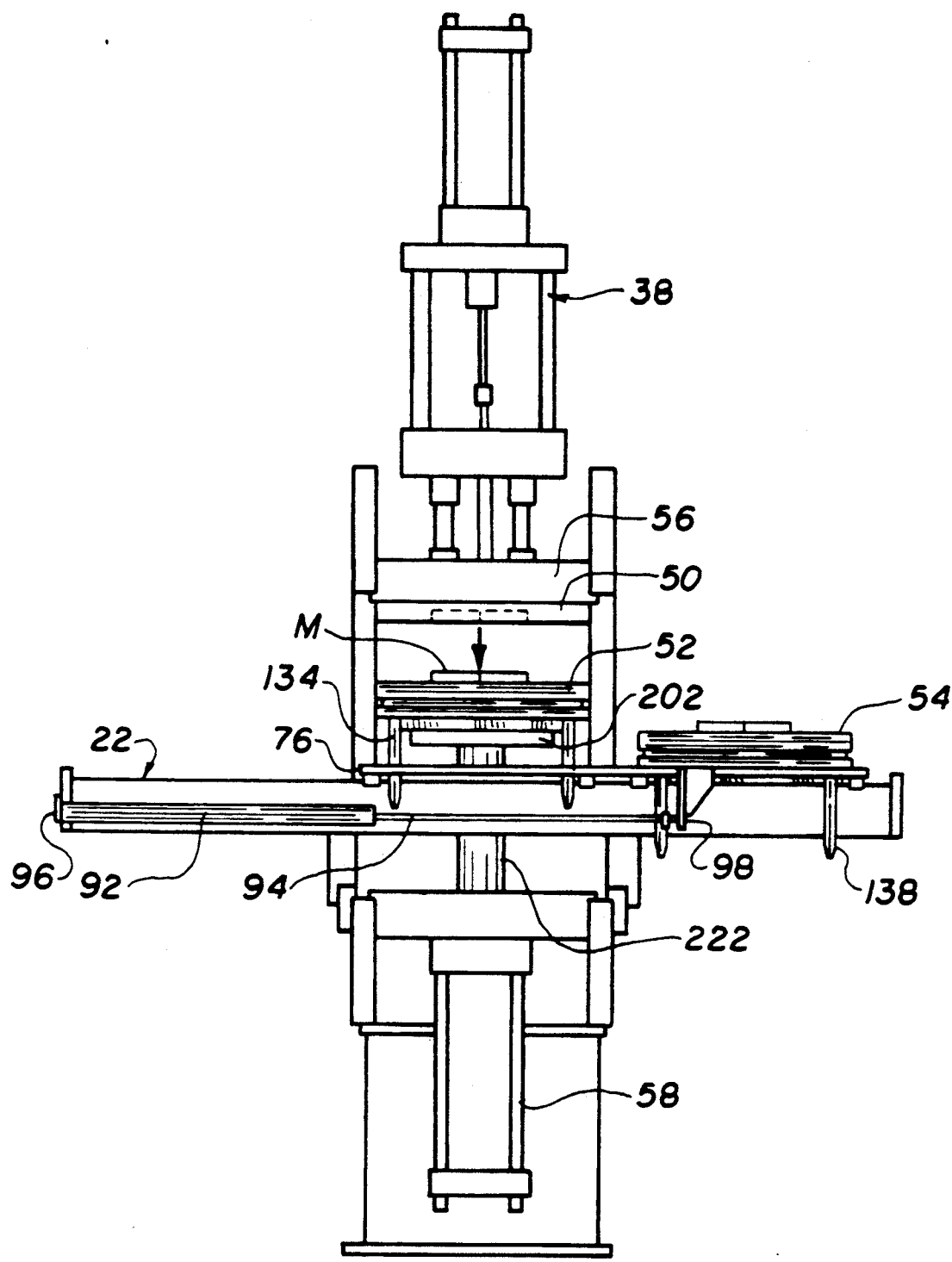
Figure 2E:
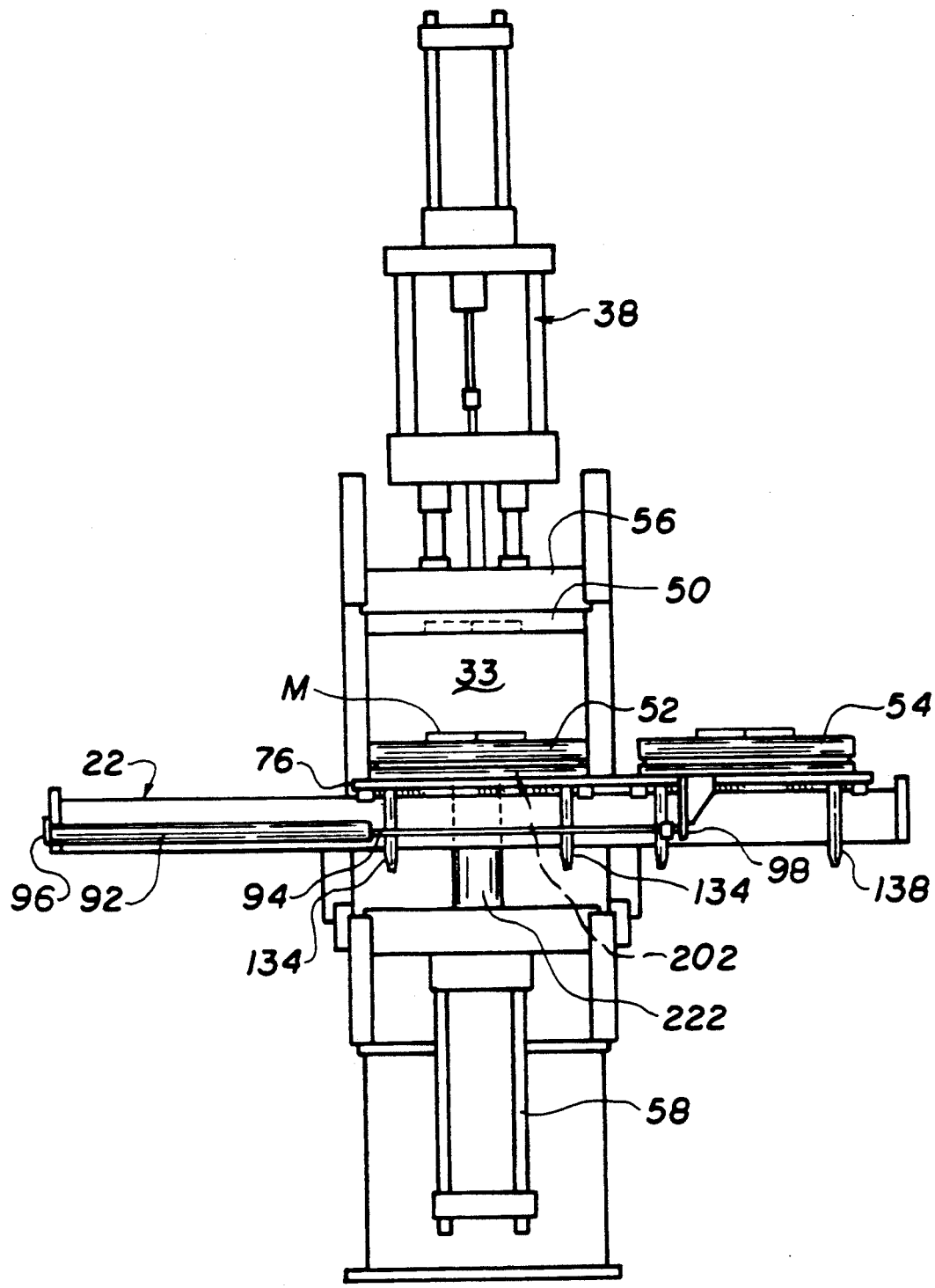
Figure 2F:
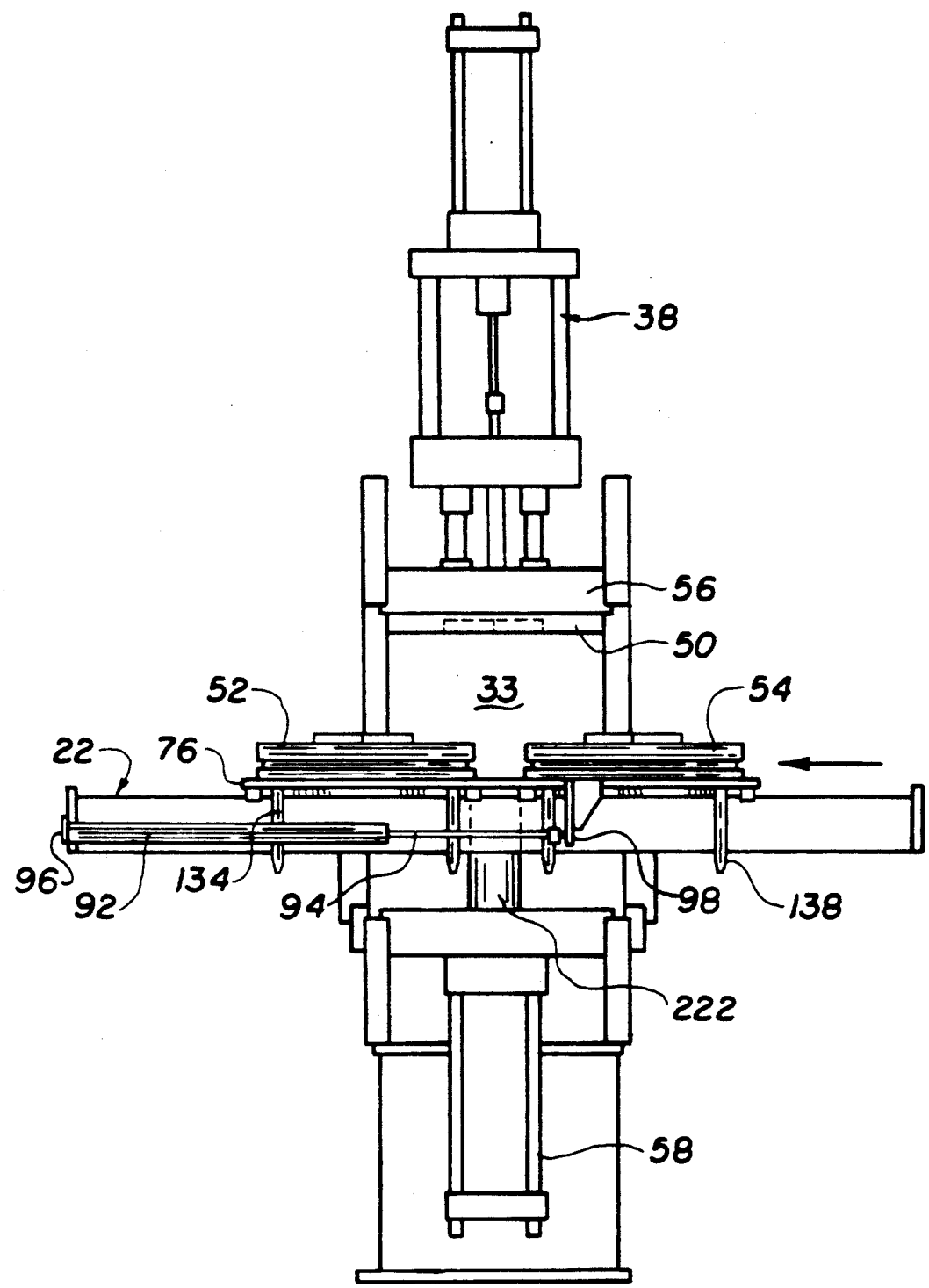
Figure 2G:
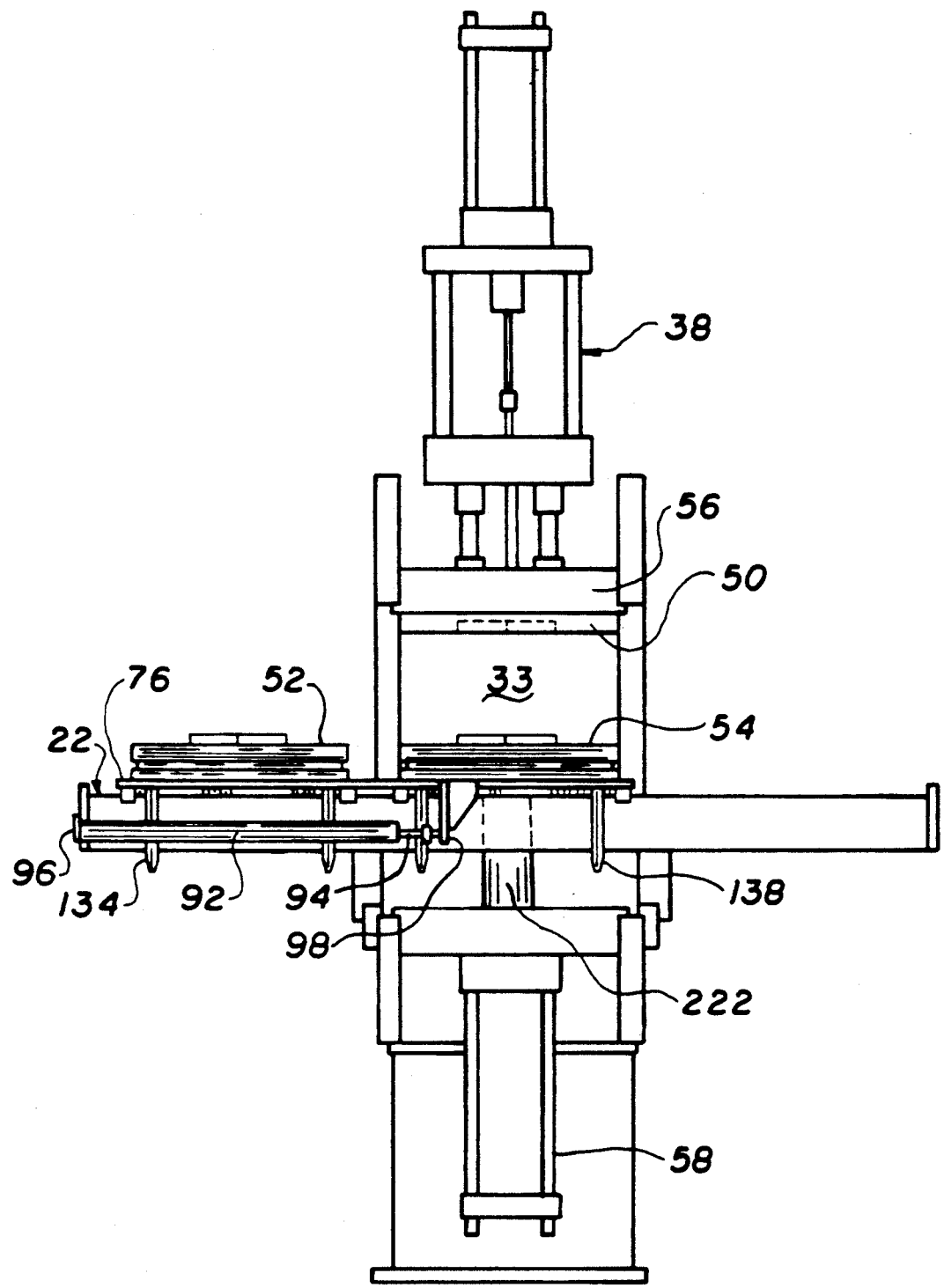
Figure 2H:
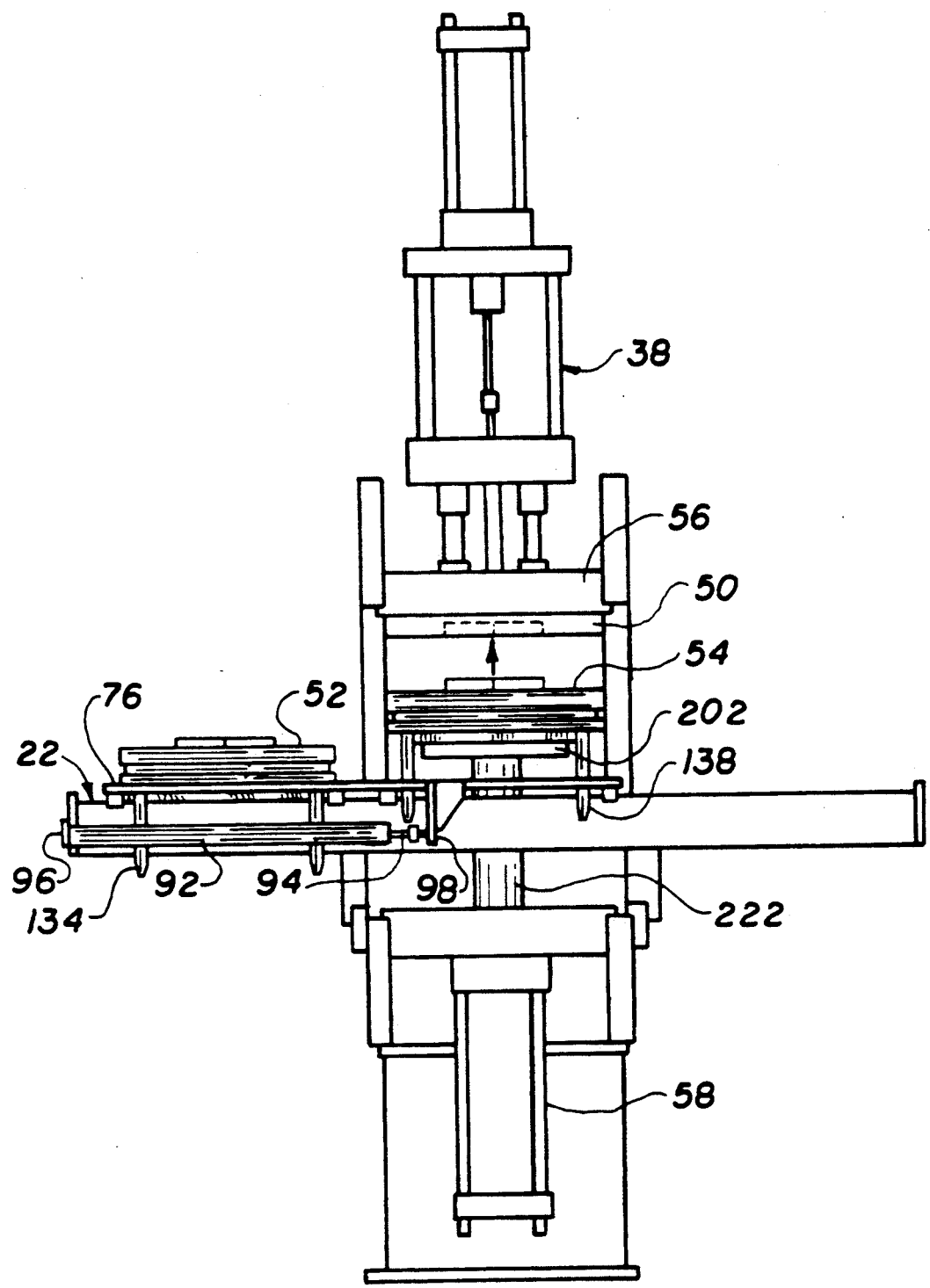
Figure 21:
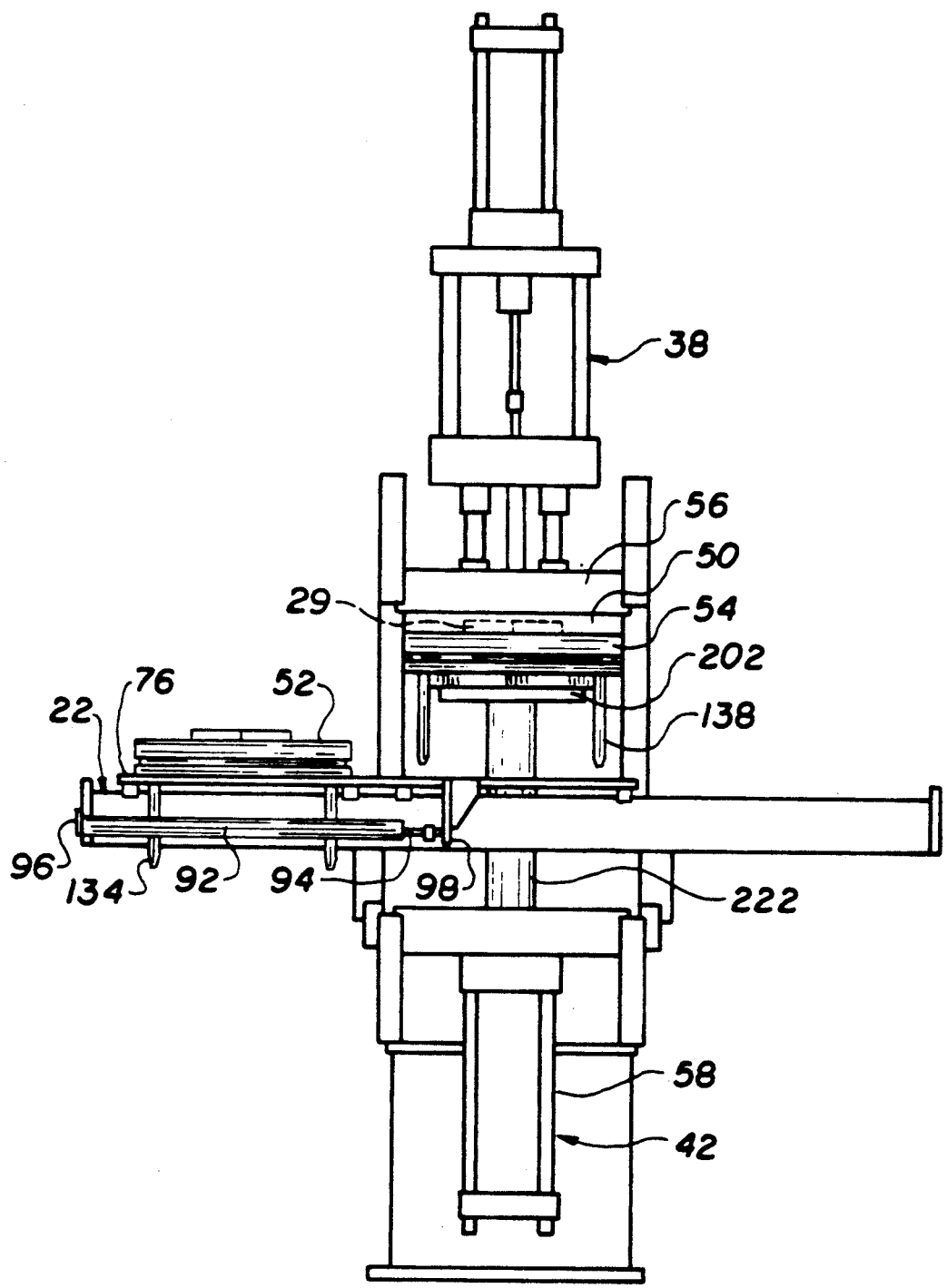
Figure 2J:
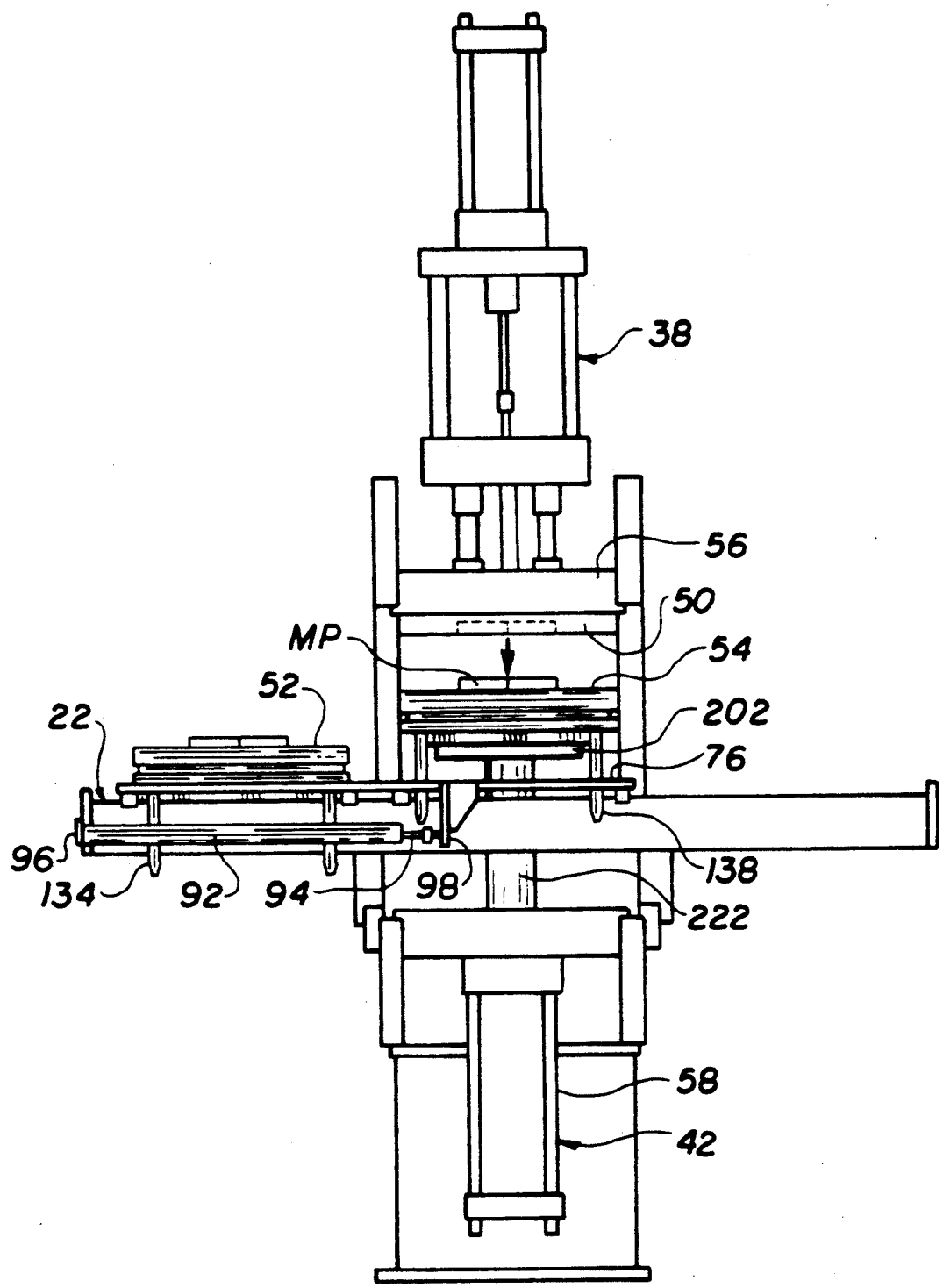

The particular movement of the movable mold platen units 52 and 54 during the molding operation are best explained by referring to schematic FIGS. 2A-2J. For ease in explanation, the arrangement shown in FIG. 2A may be designated as a starting point, and at this point, the components of the machine are arranged as follows:

i) the stationary mold platen unit 50 is secured to the clamping plate 56, which is attached to the machine frame 24 intermediate the vertical plates 25;

ii) the movable mold platen units 52 and 54 are releasably coupled to the shuttle assembly 22 whereby they are both situated at the shuttling level;

iii) the first lower movable mold platen unit 52 is situated in a clamping position which is vertically aligned with but spaced from the stationary upper mold platen unit 50;

iv) the second movable mold platen unit 54 is situated in a second loading/unloading position which is offset to the right from the stationary mold platen unit 50 as viewed in FIG. 2A; and v) the movable clamping device 58 is coupled to the first movable lower mold platen unit 52.

In the next stage of the molding operation, the [movable] clamping device 58 is moved upward from the shuttling level whereby the first movable lower mold platen unit 52 is uncoupled from the shuttle assembly 22. (See FIG. 2B). This movement is continued until the movable clamping device 58 reaches an injection level at which the first movable lower mold platen unit 52 will be joined together with the stationary upper mold platen unit 50 to cooperatively form a first mold cavity 28. (See FIG. 2C). Once the first mold cavity 28 has been formed, the molding process may begin. Simultaneously, unloading/loading duties may be preformed on the second movable mold platen unit 54 which is situated in the second loading/unloading position.

After the molding process is completed, the movable clamping device 58 is retracted to vertically lower the first movable platen unit 52 from the injection level to the shuttle level, whereby it is re-coupled to the shuttle assembly 22. (See FIGS. 2D and 2E). The shuttle assembly 22 will then horizontally index the first movable mold platen unit 52 from the clamping position to the first unloading position, with such horizontal motion being operative to uncouple the first mold platen unit from the piston rod of the movable lower clamping device 58. This horizontal shuttling of the first movable mold platen unit 52 will simultaneously result in the second movable mold platen unit 54 being horizontally moved from the second loading/unloading position to the clamping position. Such horizontal movement will also result in the second movable platen being coupled to the piston rod of movable clamping device 58. (See FIGS. 2F and 2G).

One the first movable mold platen unit 52 is returned to the first unloading/loading position, unloading and loading duties are performed thereon in an easily accessible location. Simultaneously the piston rod of movable clamping device 58 is moved upward to elevate the second movable mold platen unit 54 and uncouple it from the shuttle assembly 22. (See FIG. 2H). The upward movement of the movable clamping device 58 will continue until the second movable mold platen unit 54 reaches the injection level. At the injection level the platen unit 54 is joined together with the stationary mold platen unit 50 to cooperatively form a second mold cavity 29. (See FIG. 2I). A shot of injection material is then injected into the second mold cavity to create a second molded product MP.

Figure 2K:
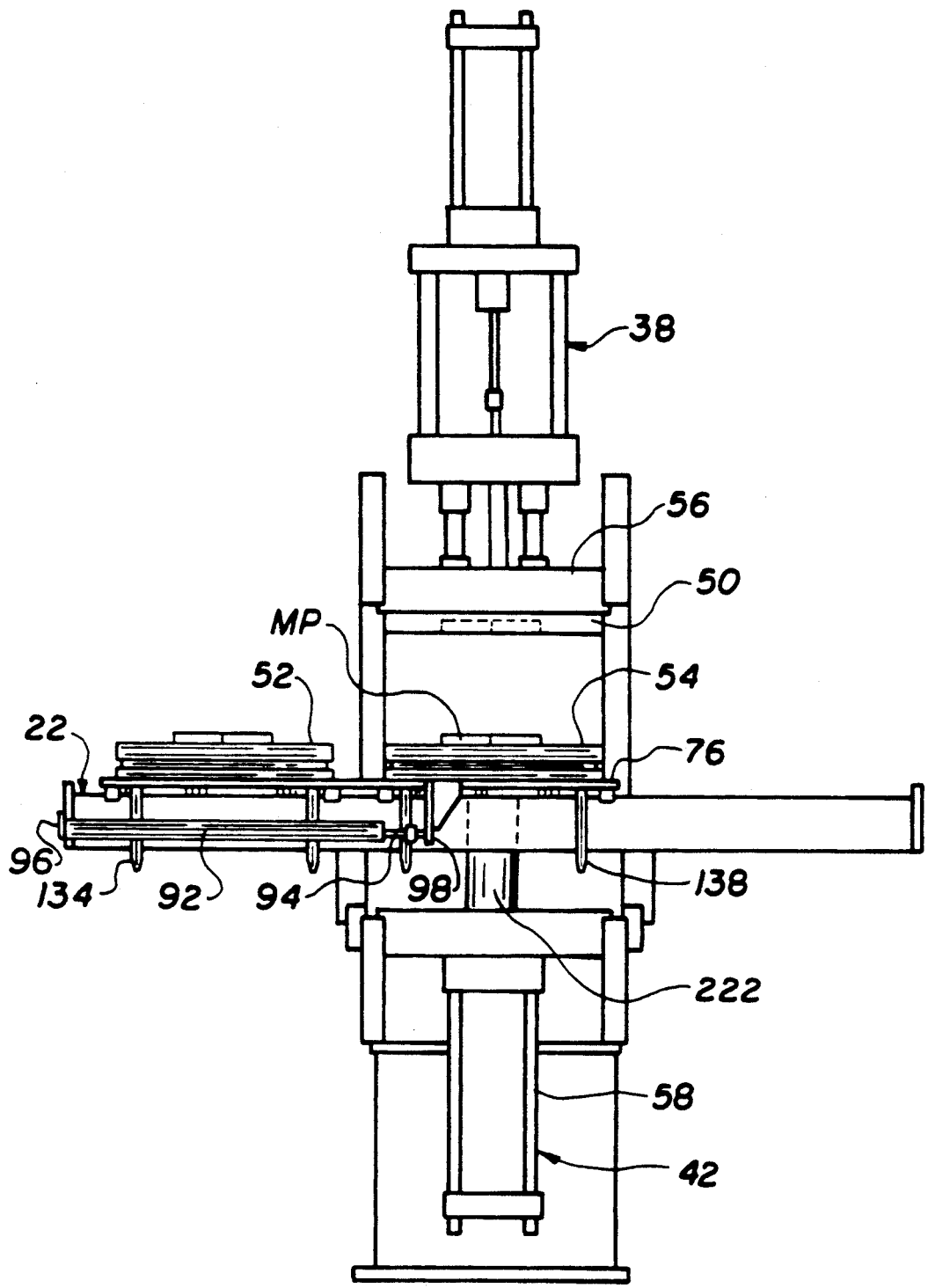
Figure 2L:
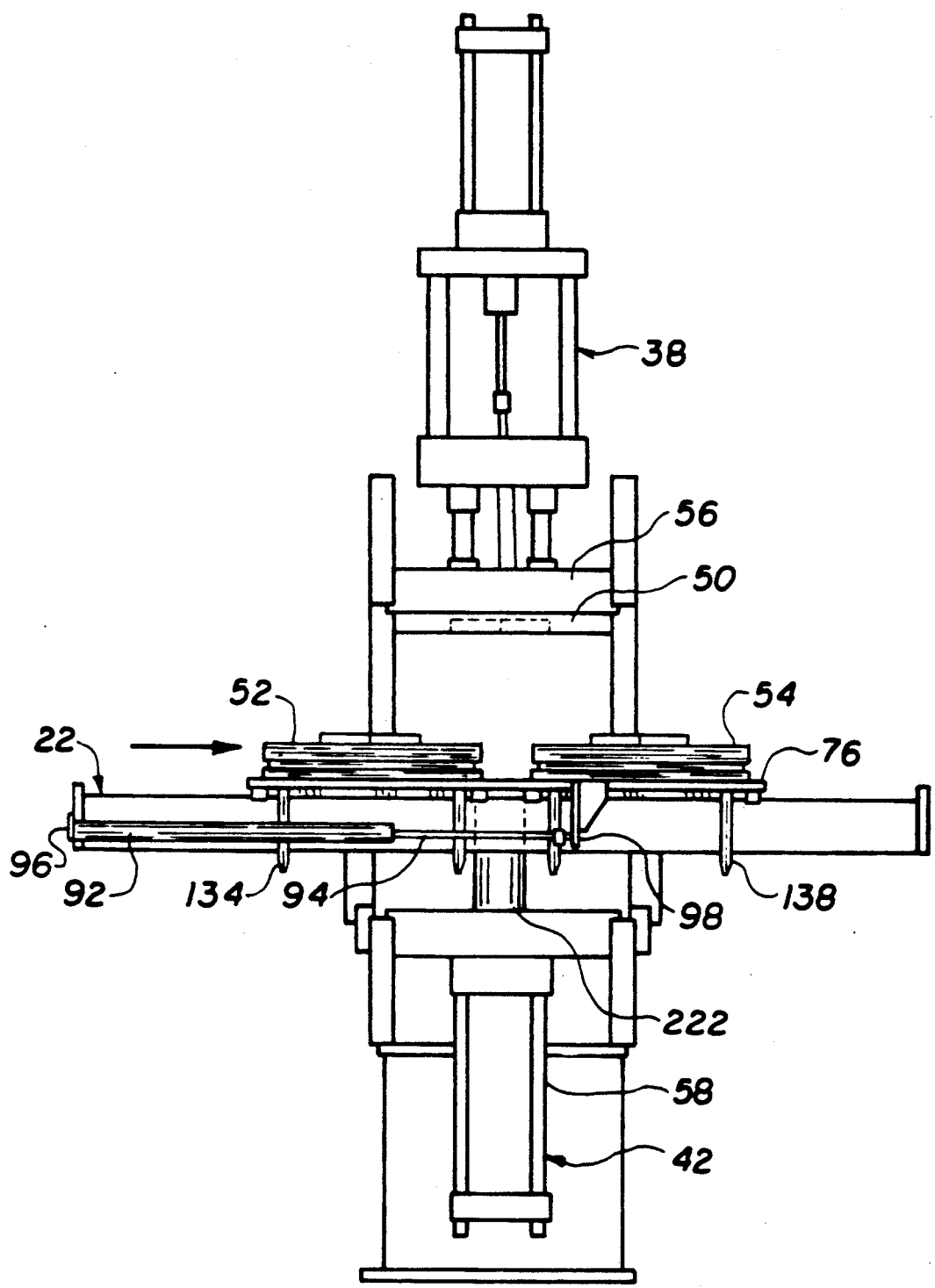

Once the second molded product MP has been made, the movable clamping device 58 is retracted to lower the second movable mold platen unit 54 from the injection level to the shuttle level, whereby the second unit 54 is re-coupled to the shuttle assembly 22. (See FIGS. 2J and 2K). The shuttle assembly 22 subsequently horizontally moves the second movable mold platen unit 54 from the clamping position to the second unloading-/loading position. This horizontal movement thereby uncouples the second mold platen unit 54 from the piston rod of the movable clamping device 58 and simultaneously horizontally moves the first movable mold platen unit 52 to the clamping position. (See FIG. 2L).

The second molded product MP may then be unloaded from the second movable mold platen unit 54 and another unfinished product may be subsequently loaded therein. At this point in the cycle, the machine 20 has returned to the "starting point" of FIG. 2A and the cycle may be continuously repeated until the desired number of molded products M, MP have been produced.

Referring now to FIGS. 3-4, the shuttle assembly 22 includes a shuttle-support unit, indicated generally at 70. The shuttle support unit 70 comprises a pair of parallel tracks 72 and end plates 73 and 74 attached to opposite ends thereof. The shuttle-support unit 70 is secured to the machine frame 24 by a pair of support blocks 75 which are roughly T-shaped in transverse geometry. (See FIG. 3). The tracks 72 extend horizontally through, and beyond each side of, the molding chamber 33.

A shuttle-mold interfacing unit or table, indicated generally at 76, is slidably coupled to and supported by the tracks 72 and its motion relative thereto is controlled by a shuttle-drive unit 78. In certain stages of the molding process, the movable mold platen units 52 and 54 are securely, but removably, coupled to the shuttle-mold interfacing unit 76. The shuttle components are designed so that shuttle-mold interfacing unit 76 may be selectively reciprocally indexed in a shuttling-travel path between a first loading/unloading position and a second loading/unloading position as discussed above and shown in FIG. 2A-K.

Figure 5:
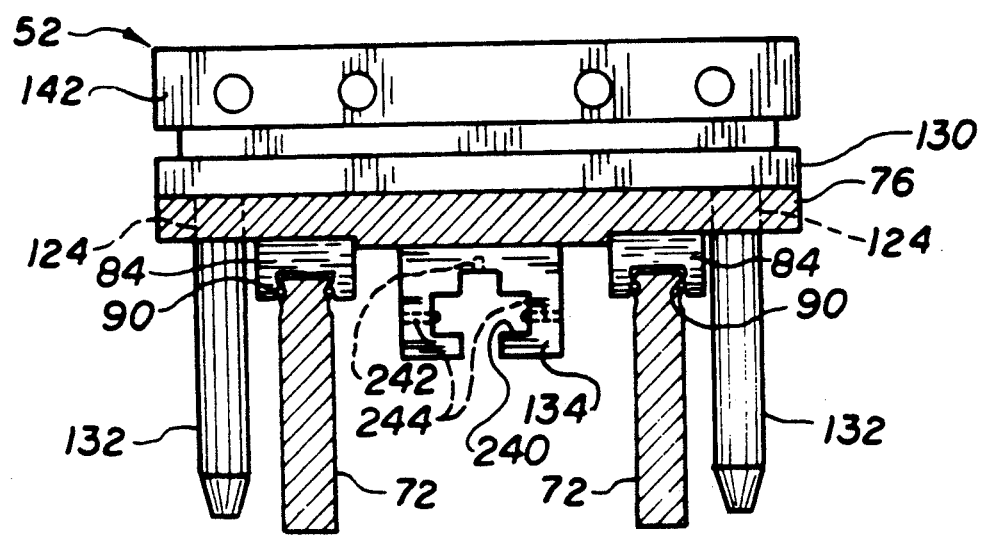
FIG. 5 is a side isolated view of certain components of the shuttle assembly and the mold pallet assembly.

The coupling of the shuttle-mold interfacing unit 76 to the tracks 72 is accomplished by linear-motion coupling members 84 which are carried by and extend downwardly from unit 76 as best seen in FIG. 5. "Linear-motion coupling member" in this context corresponds to any type of coupling component, such as conventional bearings, which would allow linear movement of the unit 76 relative to the tracks 72. In the illustrated embodiment of FIG. 5, the coupling members 84 each include a downwardly opening channel and bearings 90. Stops 100 are additionally provided secured to the end plates 73, 74 as illustrated in FIGS. 3 and 4. The stops 100 are provided to engage the unit 76 and are preferably conventional spring shock absorbers.

The shuttle-drive unit 78 includes a conventional hydraulic cylinder 92 having a shuttle piston rod 94 which is attached on one end to a cylinder-support bracket 96 secured to the first end plate 73 of the shuttle-support unit 70. A rod-interface bracket 98 secures the second end of the cylinder 92 to an intermediate portion of the shuttle-mold interfacing unit 76. In FIG. 4 the shuttle piston rod 94 is fully extended relative to the cylinder 92 and the length of its stroke is such that in this fully extended condition, the shuttle-mold interfacing unit 76 is located in the second loading/unloading position. The length of the stroke of the shuttle-drive unit 78 is also chosen so that when the shuttle-rod 94 is fully retracted, the shuttle-mold interfacing unit 76 will be located in the first loading/unloading position.

Figure 6:
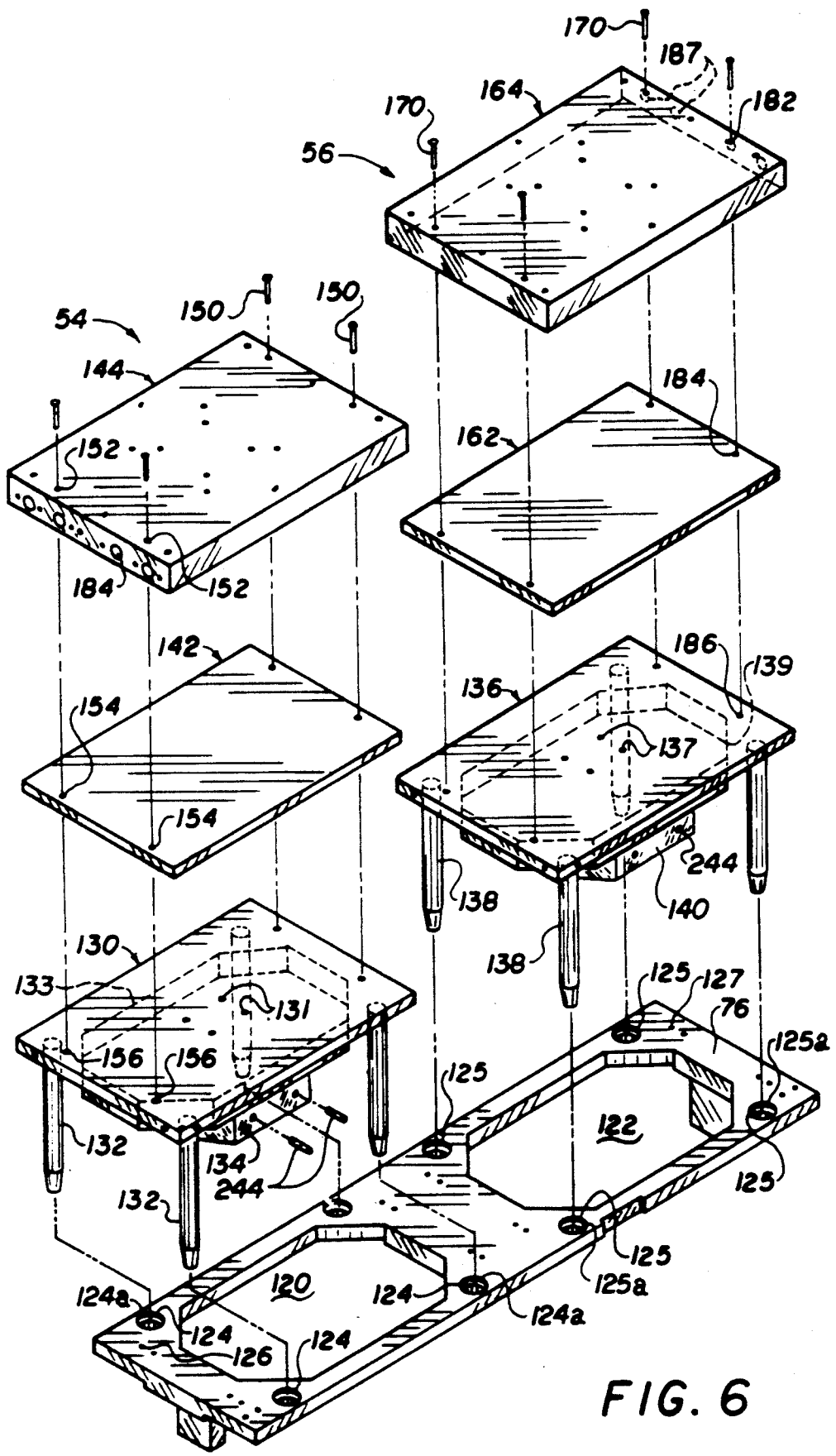
FIG. 6 is an exploded perspective view of certain components of the shuttle assembly and the mold pallet assembly.

As best shown in FIGS. 4 and 6, the shuttle-mold interfacing unit 76 is rectangular and includes first and second octagonal openings 120, 122 which respectively correspond to the coupling location of the first and second movable lower mold platen units 52 and 54, respectively. The shuttle-mold interfacing unit 76 additionally includes a first set of pilot openings 124, and a second set of pilot openings 125, each of said openings having bearings 124a, 125a for engagement with coupling posts. Openings 126, openings 127 are also provided in the interfacing unit for engagement with fasteners securing the linear coupling members 84 in position. (See FIG. 6).

As was indicated above, the mold pallet assembly 40 includes a stationary mold platen unit 50, a first movable mold platen unit 52, and a second movable mold platen unit 54. The upper mold platen unit 50 preferably remains stationary throughout the molding process and includes a mold profile plate which has a complimentary contour relative to the mold profiles of the movable mold platen units 52 and 54.

The first and second movable mold platen units 52 and 54 are essentially identical in construction. The first mold platen unit 52 includes a first shuttle/clamp-interfacing plate 130, having a first set of coupling posts 132 and a first octagonal insert 133 secured thereto. The octagonal insert is secured to the plate via conventional fasteners through openings 131. The coupling posts 132 project from the shuttle/clamp interfacing plate 130 and are sized and arranged to be selectively inserted into the pilot openings 124 in the shuttle-mold interfacing unit 76. The octagonal insert 133 also projects downwardly from the mold-shuttle/clamp interfacing plate 130 and is sized and arranged to be inserted into the first octagonal opening 120 in the shuttle-mold interfacing unit 76. The first mold platen unit 52 also includes a clamping-coordinating component, which is indicated generally at 134, which is connected to and extends downwardly from octagonal insert 133. The clamping-coordinating component 134 is selectively coupled to the lower clamping device 58 of the clamping assembly 42 as will be described in more detail below.

The second movable mold platen unit 54 is essentially identical to the first movable mold platen unit 52, and includes a second shuttle/clamp-interfacing plate 136, having a second set of coupling posts 138, a second octagonal insert 139, and a second clamping-coordinating component 140. The insert 139 is secured to the plate 136 via conventional fasteners through openings 137.

The first movable mold platen unit 52 further includes a first insulation plate 142 and a first lower heating platen 144 which maintain the necessary temperature conditions within the mold cavity 28 during the molding process. Heating elements 184 for engagement with a heater unit are provided in the platen 144. The first insulation plate 142 is stacked on top of the first mold-shuttle/clamp-interfacing plate 130 and the heating platen 144 is stacked on top of the first insulation plate 142. The components are then fixedly attached in this arrangement by conventional fasteners 150 which extend through aligned openings 152, 154, and 156.

The second movable mold platen unit 54 likewise includes a second insulation plate 162 and a second lower heating platen 164. The second lower heating platen 164 maintains desired temperature conditions during the molding process using heating elements 187, which engage a heater unit in the platen 164. These components 162 and 164 and the second shuttle/clamp-interfacing plate 136 are stacked in a manner similar to the comparable components of the first movable mold platen unit 52, and secured together by conventional fasteners 170 which extend through openings 182, 184, and 186.

The shuttle assembly 40 includes a first heating unit 180 and a second heating unit 182 which are thermally coupled to the first and second heating platens 144, 164 and heating elements 184, 187, respectively (see FIGS. 3, 4 and 6). Coupling is accomplished by engagement of the elements 184, 187 in the first lower heating platen 144 and second lower heating platen 164, respectively with the first heating unit 180 and second heating unit 182, respectively. When coupled in this manner as shown in FIG. 3, the first heater unit 180 extends in cantilever fashion from one end of the shuttle-mold interfacing unit 76. The second heating unit 182 is coupled to the opposite end of the shuttle-mold interfacing unit 76 in a similar manner.

An electrical power source supplies the heating units 180 and 182 with power via electrical supply lines (not specifically shown). The first and second set of supply lines extend from terminal boxes 188 and 190, respectively, and are contained within first and second "extendable/retractable" umbilical conduits 192 and 194, respectively. As shown in FIG. 3, the first terminal box 188 is mounted on the shuttle-support unit 70 adjacent the first end plate 73, and the second terminal box 190 is mounted adjacent the second end plate 74. This mounting arrangement results in the conduits 192 and 194 extending in roughly J-shaped paths. The conduits 192 and 194 have sufficient flexibility and linear extension and contraction capacity to accommodate horizontal shuttle movement and vertical mold platen unit movement.

Figure 7:
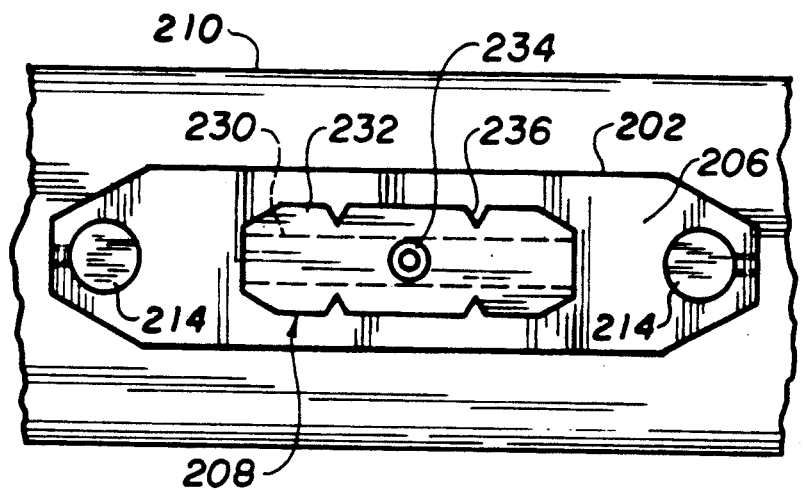
FIG. 7 is a top view of the movable clamping device.

As indicated above, the clamping assembly 42 includes an upper stationary clamping plate 56 and a lower movable clamping device 58. The stationary clamping plate 56 illustrated in FIG. 1, is secured to the frame 24 intermediate the vertical plates 25 below the injector plate 27 which in part supports the injection assembly 38. The movable clamping device 58 includes a clamp-mold interfacing unit indicated generally at 202 and a clamp cylinder unit, indicated generally at 204. (See FIGS. 7 and 8).

The clamp-mold interfacing unit 202 includes an octagonal base plate 206 which is of a similar geometry, but lesser dimensions, than the octagonal openings 120/122 in the shuttle-mold interfacing unit 76. In this manner, the clamp-mold interfacing unit 202 may pass between the tracks 72, and through the appropriate octagonal opening 120/122 in the shuttle-mold interfacing unit 76, to interface and move the movable mold platen unit 52/54. The clamp-mold interfacing unit 202 further includes a clamp-mold coupling component 208 which coordinates with the clamping-coordinating components 134 and 140 of the movable mold platen units 52 and 54, respectively.

Figure 8:
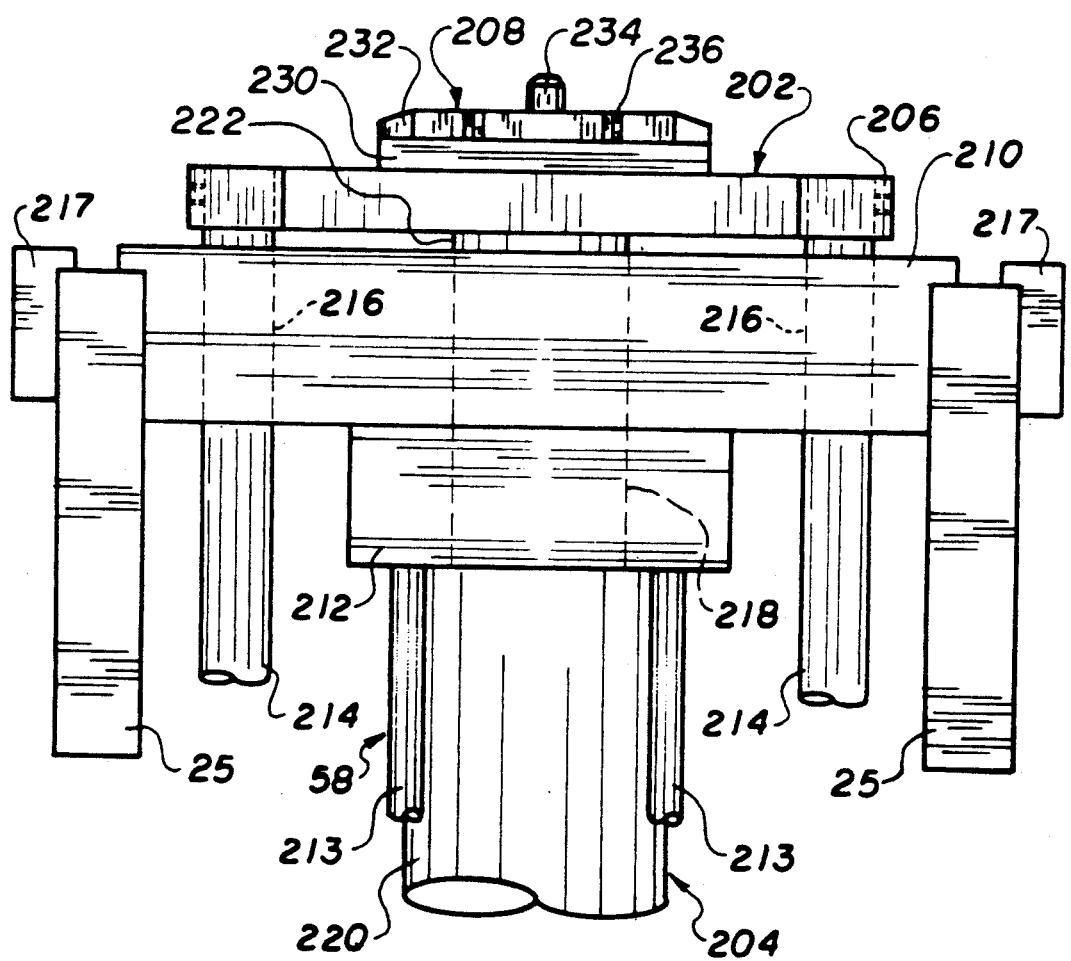
FIG. 8 is a side view of a portion of the clamping assembly, namely a movable clamping device, this device being shown generally isolated from the other components of the machine.

The movable clamping device 58 is secured to the machine frame 24 supported on a mounting plate 210 which is secured to the vertical plates 25 via conventional fasteners, as shown in FIG. 8. As set forth above, the movable clamping deice 58 includes a clamp cylinder unit 204 having a conventional hydraulic cylinder 220 including a piston rod 222, a supporting base 212 and supporting rods 213. The clamp-mold interfacing unit 202 includes a pair of guide posts 214 which project downwardly from the bottom surface of the octagonal base plate 206 and are slidably received in corresponding openings 216 in the mounting plate 210. The mounting plate 210 further includes a central opening or bore 218 which slidably receives the piston rod 222 of the clamp cylinder unit 204. The bottom surface of the octagonal base plate 206 of the clamp-mold interfacing unit 202 is secured to the piston rod 222.

The clamp-mold coupling component 208 is generally T-shaped in cross section, and has first and second legs 230, 232 in perpendicular relationship to one another. A locating pin 234 extends from a central portion of the second leg 232 and a pair of triangular detentes 236 are located on each side of the second leg 232. The T-shape of the coupling component 208 allows it to be slidably received within an open-ended cross-shaped channel 240 in the clamping-coordinating component 134 or 140. When properly positioned, the locating pin 234 will be inserted into an opening 242 in the component 134/140 and ball plungers 244 may be provided to engage the detentes 236. Thus, horizontal indexing of the lower platen units 52 and 54 will result in the coupling component 208 at the free end of clamp piston rod 222 being received endwise within the clamp-mold coupling component 208 on the lower platen unit assuring the clamping position.

One may now appreciate that the machine 20 is adapted to allow unloading and loading steps to be performed on one movable mold platen unit 52/54 while the other unit is participating in the injection/curing procedures. Consequently, the machine 20 is not idle for any significant length of time during the molding process. This reduction in idle machine time results in increased productivity of both the machine 20 and the operator. Additionally, because the first and second unloading positions are offset from the molding chamber 33, and are situated at a single shuttling level, the operator may easily and efficiently perform the unloading and loading steps. Furthermore, the movable mold platen units 52 and 54 may be easily initially installed on the shuttle assembly 22. Still further, the shuttle assembly 22 may be held stationary in either the first or second unloading position and the machine 20 may be used in a "single" molding process.

In the preferred embodiment of the injection molding machine 20, a control system 60 is additionally provided, as illustrated in FIG. 1, which is programmable to control all aspects of operation of the supply assembly, extruder assembly 36, injection assembly 38, shuttle assembly 22, mold pallet assembly 40 and clamping assembly 42. The control system includes the main electric power supply (not illustrated) for the machine 20. Additionally, the control system includes an hydraulic unit 61 which actuates the extruder assembly, injection assembly, shuttle assembly 22 and clamping assembly 42. The hydraulic unit is preferably a conventional closed loop flow and valve system. Pressure and temperature safety switches may also be provided in the machine 20 which interface with the control system 60.

The control system 60 includes a conventional programmable computer 62 for programming the predetermined desired settings and operating conditions for operation of the machine 20, and a control panel 63 for use by an operator during operation of the machine. In the preferred embodiment, the control panel 63 is a Cincinnati Electrosystems 3045 operator interface, and the programmable computer is a Mitsubishi A Series logic controller. The computer and control panel provide programmed or manual instructions for all machine functions, including activation of the various cycles described above. While the specific commercial systems listed are preferred, they may be any one of a number of commercial operator-interface programmable systems. Additionally, the operator control panel 63 includes a manual safety switch to enable the operator to shut off the machine during any stage of operation.

Based on the information programmed into the control system 60, an automatic cycle can be developed to operate the shuttle assembly 22. Alternatively, the operator controls can be used to initiate the machine cycles as may be desired.

Although the preferred form of the apparatus has been described above, it should be understood that obvious alterations may be made to the present disclosure to achieve comparable features and advantages. With the present disclosure in mind, it is believed that such features and advantages will become apparent to those of ordinary skill in the art.

What is claimed is:

1. A method of injection molding comprising the steps of:
   securing a stationary mold platen unit in a field position;
   situating a first movable mold platen unit in a clamping position aligned with the stationary mold platen unit at a shuttling level;
   situating a second movable mold platen unit in a second unloading position in the same plane as said shuttling level but offset from the stationary mold platen unit;
   moving the first movable mold platen unit from the plane of the shuttling level to an injection level where said movable mold platen unit is joined together with the stationary mold platen unit to form a first mold cavity while the second movable mold platen unit remains in the plane of the shuttling level,
   injecting an injection material into the first mold cavity;
   curing the injection material injected into the mold cavity to form a first molded product;
   moving the first movable mold platen unit from the plane of the injection level to the plane of the shuttling level;
   shuttling the first movable mold platen unit from the clamping position to a first unloading position in the same plane as said second unloading position and shuttling level; and
   shuttling the second movable mold platen unit from the second unloading position to the clamping position.

2. A method as set forth in claim 1 wherein said step of shuttling the first movable mold platen unit from the clamping position to the first unloading position, and the step of shuttling the second movable mold platen unit, and the step of shuttling the second movable mold platen unit from the second unloading position to the clamping position, are performed simultaneously and in the plane of the shuttling level.

3. A method as set forth in claim 2 further comprising the steps of unloading the first molded product from the first movable mold platen unit while it is in the first unloading position.

4. A method as set forth in claim 3 wherein said steps of situating the first movable mold platen unit in the clamping position and situating the second movable mold platen unit in the second unloading position comprise the steps of:
   providing a shuttling assembly having a stationary shuttle support unit;
   slidably coupling a shuttle-mold interfacing unit to the shuttle support unit;
   removably coupling the first movable mold platen unit to the shuttle-mold interfacing unit whereby it is situated at said shuttling level;
   removably coupling the second movable mold platen unit to the shuttle-mold interfacing unit whereby it is also situated at the shuttling level; and
   shuttling the shuttle-mold interfacing unit to a second shuttle-unloading position where the first movable mold platen unit is situated at the clamping position and the second movable mold platen unit is situated at the second unloading position.

5. A method as set forth in claim 4 wherein said shuttling steps include the step of substantially horizontally moving the shuttle-mold interfacing unit, and wherein said moving steps include the step of substantially vertically moving a clamp-mold interfacing unit removably coupled with said first or second movable mold platen unit.

6. A method as set forth in claim 1 further including the steps of:
   moving the second movable mold platen unit from the shuttling level to said injection level where said second movable mold platen unit is jointed together with the stationary mold platen unit to form a second mold cavity;
   injecting an injection material into the second mold cavity;
   curing the injection material injected into the second mold cavity to form a second molded product;
   moving the second movable mold platen unit from the injection level to the shuttling level;
   shuttling the second movable mold platen unit from the clamping position to the second unloading position; and
   shuttling the first movable mold platen unit from the first unloading position to the clamping position.

* * * * *